United States Patent [19]

Sandberg

[11] Patent Number: 4,784,773

[45] Date of Patent: Nov. 15, 1988

[54] PETROLEUM PRODUCT ABSORBTION METHOD AND APPARATUS

[76] Inventor: Frank H. Sandberg, 524 W. Shady La., Mequon, Wis. 53092

[21] Appl. No.: 78,235

[22] Filed: Jul. 27, 1987

[51] Int. Cl.$^4$ .............................................. C02F 1/40
[52] U.S. Cl. ................................. 210/691; 210/242.4; 210/484; 210/502.1; 210/924
[58] Field of Search ..................... 210/680, 690–693, 210/502.1, 924, 242.4, 504, 505, 508, 484

[56] References Cited

U.S. PATENT DOCUMENTS

| | | | |
|---|---|---|---|
| 3,607,741 | 9/1971 | Sohnius | 210/680 |
| 3,617,565 | 11/1971 | Fahivik | 210/40 |
| 3,812,973 | 5/1974 | Stern | 444/71 |
| 4,343,680 | 8/1982 | Field et al. | 162/100 |
| 4,401,475 | 8/1983 | Eriksson et al. | 134/6 |
| 4,537,877 | 8/1985 | Ericsson | 210/924 X |

OTHER PUBLICATIONS

Article on Oil Absorbtion Entitled "Pig" from New Pig Corporation of Altoona, Pa. 16601.

Primary Examiner—Tom Wyse
Attorney, Agent, or Firm—Andrus, Sceales, Starke & Sawall

[57] ABSTRACT

An oil absorbing and confining product includes a by-product from manufacture of wooden lead pencils and the like. Incense-cedar in its natural state has a natural hydrophobic constituent in a form of a natural resin material. During processing of incense-cedar wood for pencil making, various dyes and the like are added and in addition a small additional amount of wax is added. A waste by-product is generated in the form of fine shavings, fibers and sawdust which uniquely functions for oil absorption with rejection of water absorption. The material can be applied in its waste form to a water surface covered with oil or can be conveniently retained within a suitable flexible and porous covering such as a fabric sock or bag structure for use as a confining and absorbing dam member. The use of incense-cedar is readily destroyed through incineration or the like.

7 Claims, 1 Drawing Sheet

PETROLEUM PRODUCT ABSORBTION METHOD AND APPARATUS

BACKGROUND OF THE PRESENT INVENTION

This invention relates to a liquid petroleum product absorbing method and apparatus and particularly to a special material for absorbing of oil and the like.

Free oil on surfaces have presented significant problems since the beginning of the usage of liquid petroleum products. The relatively recent high usage of oil for various purposes and the method of transportion by large tankers has made the presence and effect of free surface oil a current topic of interest. Thus, tanker spills have been rather dramatic events because of the size and effects thereof. In fact, however free surface oil not only in and on water but in various practical applications and environments have involved clean-up of free oil for many years. Typical examples are garages, machine shops and the like. Generally prior to current large oil spills, the specialized problems have been attended to with various means of absorption and washing of the oil from the surfaces. With large oil spills on large bodies of water, however, a highly absorbent material is generally considered one of the most advantageous and efficient methods of eliminating serious consequences generally following such spills.

Various wood products have been suggested as providing a means to effect oil absorption. U.S. Pat. No. 3,617,565 which issued on Nov. 2, 1971 discloses the use of a conifer tree bark as a useful means of absorption of water born oil spills. U.S. Pat. No. 4,401,475 which issued on Aug. 30, 1983 suggests the use of simple sawdust which has been specially treated to improve its absorption characteristics. U.S. Pat. No. 4,343,680 which issued on Aug. 10, 1982 discloses a method of treating high yield wood pulps at elevated temperatures for purposes of enhancing their hydrophobic and oleophilic properties. The prior art recognizes generally however that wood fiber material as natural wood fiber material has significantly limited use as an absorbent or even a filter medium because its hydrophobic properties are generally limited. An alternative medium is suggested in U.S. Pat. No. 3,812,973 which issued May 28, 1974 and includes a fiber material or composition made from polyethylene and paraffin.

Commercially, various products are also available. For example, KYS Oil Clean is a product manufactured by Arcata Company of Standford, Conn. Gregg Oil Sponge International Inc. of Fredericksburg, Va. manufactures chips which are formed of a combination of waste paper and wood chips with some chemical treatment. The 3M Company of Minnesota manufactures an absorbent plastic material which is believed to be a shredded polyproplyene available in both a matt or loose particulate form. The KYS material and the Oil Sponge material can be burned.

A rather recent material which is made and sold for oil absorption is based on ground corn cobbs. The material is commercially available under the trademark "Pig" from New Pig Corporation of Altoona, Pa. 16601.

Notwithstanding, the significant problem created by oil spills and like free surface oil is a continuing demand for a more effective and less costly material to establish a cost efficient method of removing oil from surfaces and the like. The material should have an affinity for petroleum products and extremely minimal attraction to water or like products. In addition, the material necessarily has a high surface to volume ratio in order to establish maximum interface with the product thereby promoting the absorption of the product, which accounts for the trade generally considering sawdust and the like and would provide optinmum surface area characterists. The new material should further be adapted to packaging in a confining tube like container for building of dams and the like.

SUMMARY OF THE PRESENT INVENTION

The present invention is particularly directed to a highly absorbent material in the form of incense-cedar specially treated and generally in accordance with the treatment of incense-cedar wood for manufacture of wooden lead pencils and the like. The inventor has discovered that such material has an extreme absorption characteristic and is readily available in large quantities as waste material from pencil manufactures. Incense-cedar in its natural state has a internal natural hydrophobic constituent in a form of a natural resin material. During processing of incense-cedar wood for pencil making, various dyes and the like are added and in addition a small additional amount of wax is added. Thus, the incense-cedar is formed in slabs from which the pencils are formed by appropriate shaving and cutting. The waste by-product is generated in the form of fine shavings, fibers and sawdust. The inventor has discovered that the product in this form is uniquely adapted to oil absorption with rejection of water absorption. The material can be applied in its waste form to a water surface covered with oil and serves to rapidly and effectively absorb the oil essentially only. In addition, the material is of a sufficiently fine and soft condition that it can be conveniently retained within a suitable flexible and porous covering such as a fabric sock or bag structure for various restricted applications and use.

The incense-cedar with the absorbed oil is readily destroyed through incineration or the like. The material being a waste by-product is readily available and at minimal or no cost, thus contributing to the cost efficiency of the product.

In summary, the present invention provides a significant and improved absorbent, material, method and apparatus which is selective to petroleum products, can be readily and conveniently handled and which is based on a minimal raw material cost factor.

DESCRIPTION OF THE ILLUSTRATED DRAWINGS

The drawings furnished herewith generally illustrate the best mode presently contemplated for the invention and are described hereinafter.

DESCRIPTION OF THE ILLUSTRATED EMBODIMENT

Figure 1:
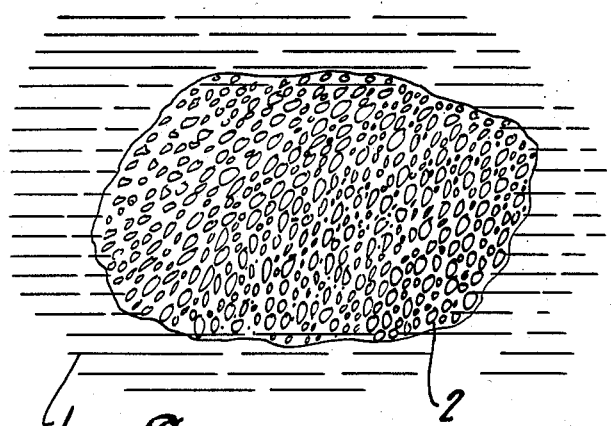
FIG. 1 is a plan view of an open body of water having an absorbent material in accordance with the present invention applied thereto.
Figure 2:
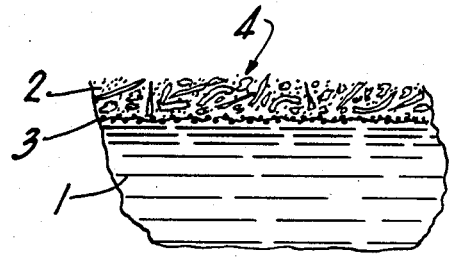
FIG. 2 is an enlarged fragmentary vertical section of the surface of the water body of FIG. 1.
Figure 3:
FIG. 3 is a further enlarged view of the material to be applied to the surface of the water body.

Referring to the drawing and particularly FIGS. 1 and 2, a body of water 1 is diagrammatically illustrated. An oil film 2 is present on the upper surface and in accordance with known phenomena essentially floats on the upper surface with some slight interface mixture as shown at 3. In accordance with the present invention, a layer of incense-cedar absorbent material 4 is applied to the oil bearing surface. The incense-cedar material 4 responds to absorb the oil while minimizing absorption of water. The illustrated incense-cedar material 4 is a light-weight combination of slivers, flakes and dust particles, such as diagrammatically shown in FIG. 3, preferably all formed of the incense-cedar material. Generally, the material in its original particulate form is a fluffy-type material particularly with shavings 5 of a thin curled form which is interwoven with each other and with elongated or flat slivers 6 and sawdust 7 to form a somewhat fluffy, open material. The waste product material of FIG. 3 tends to form a continuous mass, with however a very substantial total surface exposure. This high surface exposure is of course of substantial significance in providing maximum interface with the free oil. The incense-cedar material is in a preferred and unique embodiment, the direct waste product of the well known wooden pencil manufacturing process. In this process, the incense-cedar wood is especially treated with various substances such as dyes and also as a significant factor, a paraffin wax which is used primarily as a binder for the wood pencil structures. The inventor has discovered, that this particular incense-cedar material with the small wax additive produces a material which is significantly hydrophobic but is uniquely and significantly effective as an absorbent for petroleum products such as oil, gasoline, diesel fuel, kerosene and other petroleum base liquids.

It would appear that the paraffin wax and the inherent resin content of the incense cedar wood for pencil manufacture functions in the present invention to block and prevent water absorption. However, the interaction with petroleum product serves to break down the barrier whereupon the incense cedar functions as a highly absorbent material. Because the oil functions as the break down product, it is essentially totally absorbed in preference to the water which is separated from the product by the oil.

In any event, actual commercial application has clearly shown the effectiveness of the incense-cedar waste product as an efficient absorber having a high cost effectiveness.

More particularly, the incense-cedar material received as a waste product is particularly and uniquely adapted to the present invention in that its inherent properties are uniquely related to the demands and functions for absorbing an oil and like petroleum products. The material is light weight and in its received form of combination interwoven flakes, slivers and sawdust produces a uniform surface texture for application with a large interface with the oil. The resin content in combination with the added paraffin wax produces the highly hydrophobic characteristic until it comes into contact with the oil product. At that time it readily converts into an appropriate oleophilic material providing for a rapid and effective absorption of the petroleum product.

Generally, in the manufacture of a wooden pencil, the basic wood product is incense-cedar and more particularly identified as wood having the technical description of libocedrus decurrens or Calocedrus decurrens. The wood is received in its natural form and then combined with dyes, emulsifiers and paraffin wax. The incense-cedar material or cedar is received in a flat slab form with the approrpiate additions of the dyes, emulsifier and paraffin wax. The slab of treated incense-cedar wood is then processed by a shaving process into forms to form the formation of wood pencils. The waste product is a light wood combination of slivers, flakes and sawdust which forms a waste product mass as previously described. The waste product as formed is directly functional as the highly effective absorbent for petroleum products.

The light weight incense-cedar wood is impregnated under pressure with the coloring dyes, emulsifier and paraffin wax. Generally, the paraffin wax addition is the range of two to three percent and is added to ease the machine process in making a pencil.

For example, a multiple layered slat for making pencils have been formed with the proximate following percentages of material additions.
1. Acid black 1 (Dye): 0.08 percent
2. Acid red 14 (Dye): 0.057 percent
3. Acid orange 7 (Dye): 0.051 percent
4. Igepal (emulsifier): 0.084 percent
5. Paraffin wax (lubricant): 2–3 percent.

The actual percentages of the paraffin wax in the shavings consisting of the slivers, flakes and sawdust would contain a somewhat higher percentage of the paraffin wax. The added wax tends to concentrate on the surface of slabs or slats and such surfaces are of course removed in the machining process. The waste product is formed from the slab having the highest concentration of the paraffin wax. Although other materials may also sometimes be added in the forming of the pencil but the inventor has not found any which create any type of an adverse effect on the absorption characteristic of the incense-cedar waste product.

Inherently, the wax additions enhances the hydrophobic properties of the incense-cedar material and in combination with the inherent resin content apparently develops or forms the most effective barrier against water absorption. The barrier breaks down upon contact with petroleum products and then proceeds to rapidly absorb the wetting agent, namely, the petroleum product.

Generally it has been found that the waste product will vary in size from generally from slightly less than a quarter inch to a 60 mesh dust. It has been found that this by-product as noted is extremely effective as a petroleum product absorbent.

It should also be noted that the material can of course be used as an effective filtering medium. Thus, the material can be provided in a suitable tubular container with the waste material confined. The petroleum-bearing liquid would flow through the material in the containers with absorption of oil in passing of the other liquid products.

After the absorption of the oil to a high decree such as to saturation, the material can be readily scooped or otherwise removed from the surface. The removed material can of course be subsequently destroyed as by incineration or the like.

Such waste product material has been used as bedding for animals. However, the combination of dust and some other characteristic of the incense material is considered to adversely effect the animals, and consequently such material has not found significant commercial acceptance. As a result, incense-cedar waste products in relatively large quantities is readily available at nominal cost.

Figure 4:
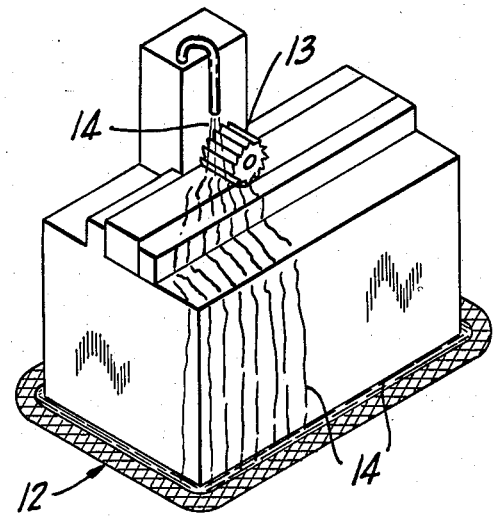
FIG. 4 illustrates an alternate embodiment of the invention wherein the incense-cedar material is confined within a tubular outer fabric.
Figure 5:
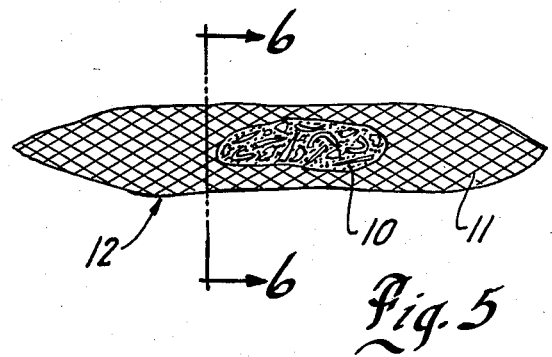
FIG. 5 is a fragmentary view of an absorbent element shaver in FIG. 4.
Figure 6:
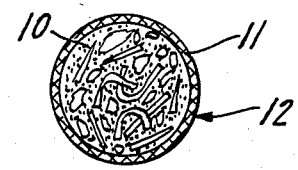
FIG. 6 is a pictoral view taken on line 6—6 of FIG. 5.

Although shown applied as a loose fluffy form, the incense-cedar product can also be confined in an appropriate form; for example, as shown in FIGS. 4–6. In this second embodiment, the treated incense-cedar material 10 is confined within an elongated tubular outer covering 11 to form an elongated dam member 12. The dam member 12 is a flexible unit to permit arrangement as a boundary about an oil bearing surface.

A typical application is diagrammatically shown in FIG. 4 as a metal cutting machine 13 where oil is applied for purposes of cooling and lubrication. The tubular dam member 12 surrounds the machine and confines the emitted oil 14 and further absorbs the oil for subsequent disposal. The outer cover 11 may be formed of a suitable woven fabric which will readily transmit and pass the free oil on the surface into the incense-cedar material 10. Again, the incense-cedar material functions to maintain the dam characteristic rejecting water and the like but rapidly responding to contact with the petroleum product such as the oil. As in the previous embodiment, the oil will tend to break down the protective surface coating on and within the incense-cedar particulate, which proceeds to rapidly absorbs the oil in large quantities.

More particularly, the sock or tubular 12 member can be formed as an essentially endless member or elongated tubular member of substantial length with the opposite ends appropriately tied off or sealed. If a shorter length of material is necessary, the user can readily tie an intermediate portion of the tubular member to the desired length and sever the outer covering at the tie portion.

The dam can obviously be applied to various other applications such as lithographic production, fire department application, oil transport as well as a floating straight, curved or encircling dam on a body of water to confine an oil slick and the like.

Another significant usage includes marine vehicle applications.

Figure 7:
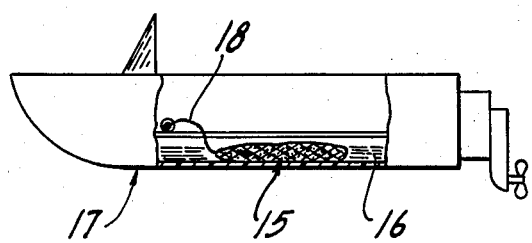
FIG. 7 is a view similar to FIG. 4 illustrating a further construction and confining an outer shell for the incense-cedar material.

Such an application is diagrammatically illustrated in FIG. 7 wherein a tube member 15 is shown in the bottom bilge portion 16 of a boat 17. The tube member 15 is formed as a closed member having the incense-cedar absorbent material confined within an outer perforated cover, such as in FIGS. 4–6. A tie line 18 is preferably provided for removal of the member. The member 15 rests within the bilge and again provides for rapid and selective absorption of the oil and other fuel forming on the water surface as well as fumes within the bilge. This minimizes creation of explosive material conditions within the bilge and establishes and maintains relatively clean bilge water which might be readily pumped overboard or to another water receiving facility.

Thus, the examples given are only a few of the many applications which presently exists and which will arise in the future where the selective absorption of a petroleum machine is desired. Thus, the present invention is particularly directed to the unique usuage of the treated incense-cedar wood product, and particularly the cost-effective waste product of pencil production as an absorption medium.

Various modes of carrying out the invention are contemplated as being within the scope of the following claims particularly pointing out and distinctly claiming the subject matter which is regarded as the invention.

I claim:

1. The method of removing of oil from a carrier, comprising supplying a layer consisting essentially of an incense-cedar particulate material, said incense material including a small amount of paraffin wax and defining a hydrophobic material.

2. The method of claim 1 wherein said method includes the assembling of said incense-cedar material as a waste product from the forming of wooden pencils, and applying of said material as received as the waste product to the oil bearing material.

3. The method of claim 1 wherein including the step of confining said material within a porous enclosure of a netting for readily transmitting of the oil bearing material into the material.

4. A tubular dam unit for confining and absorbing of petroleum product, comprising a porous tubular container formed of an apertured material, an incense-cedar particulate as the waste product of forming wooden pencils essentially filling said tubular container.

5. The dam unit of claim 4 wherein said material is comprised of slivers, flakes and sawdust.

6. The unit of claim 4 wherein said waste product incense-cedar has been treated with two to three percent of paraffin wax.

7. The unit of claim 4 wherein said waste product is from the machining of a slab of incense-cedar for manufacture of wooden pencils.

* * * * *